July 29, 1941.  G. C. STANLEY  2,251,244
PRESSURE REGULATOR
Filed Oct. 6, 1939 3 Sheets-Sheet 1
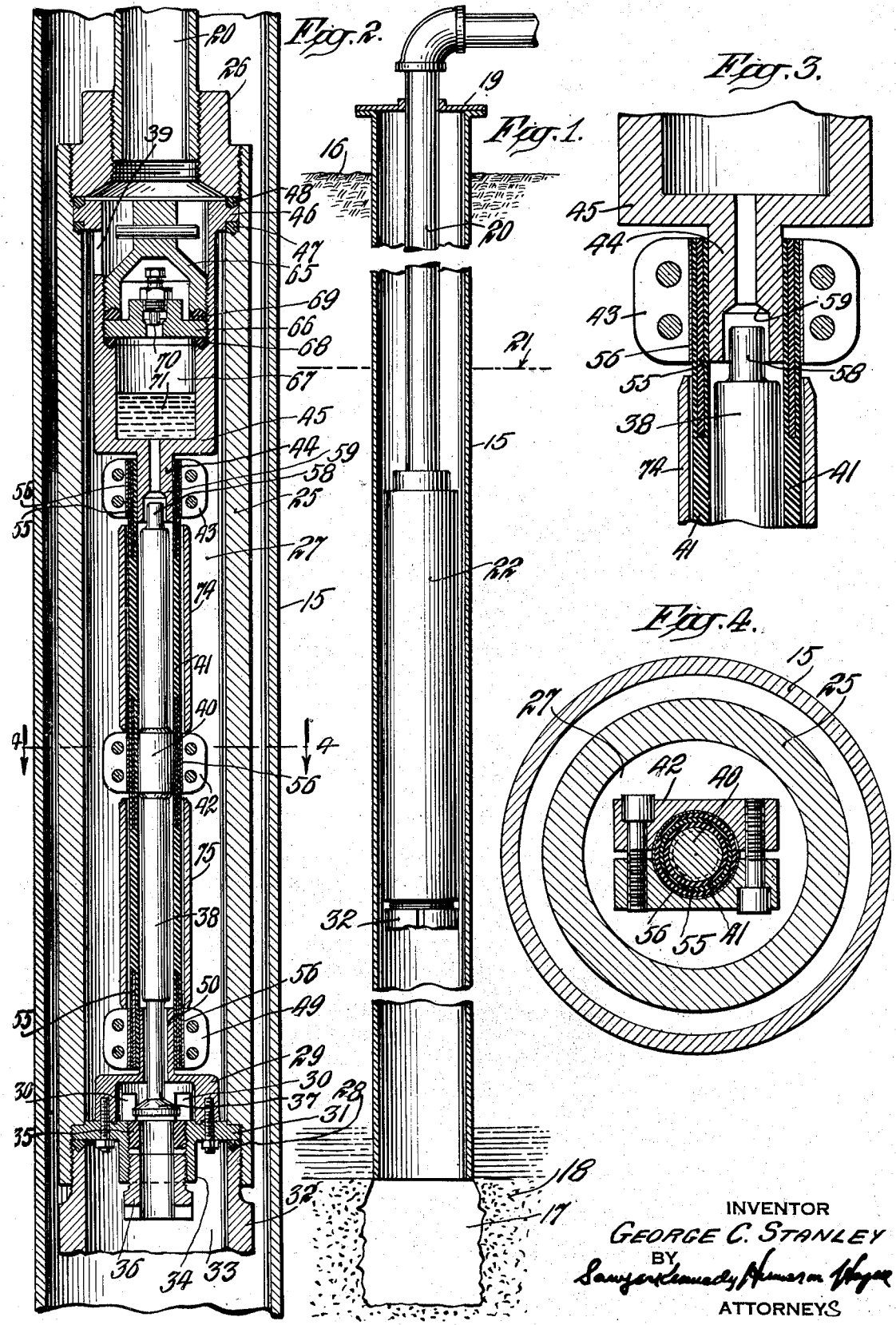
INVENTOR
GEORGE C. STANLEY
BY
ATTORNEYS July 29, 1941.  G. C. STANLEY  2,251,244
PRESSURE REGULATOR
Filed Oct. 6, 1939  3 Sheets-Sheet 2

INVENTOR
GEORGE C. STANLEY
BY
ATTORNEYS

July 29, 1941.  G. C. STANLEY  2,251,244
PRESSURE REGULATOR
Filed Oct. 6, 1939  3 Sheets-Sheet 3
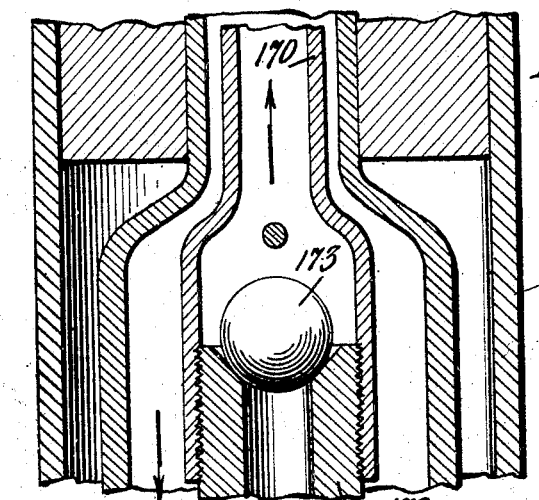
Fig. 8.
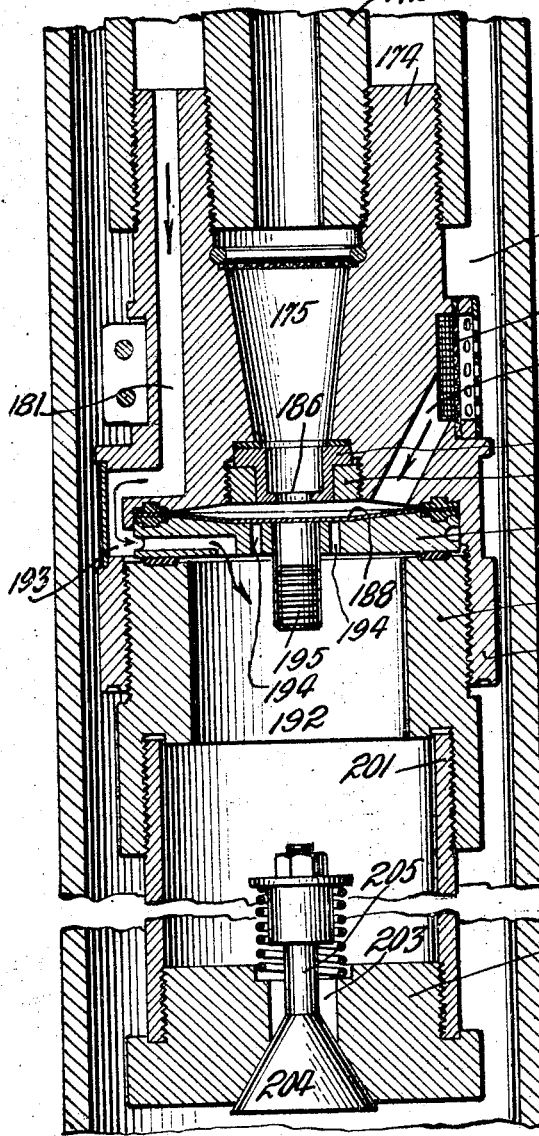
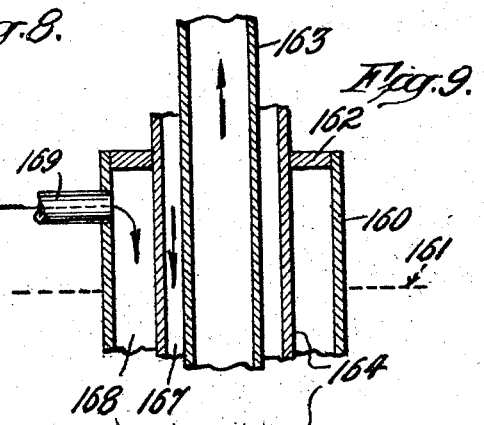
Fig. 9.
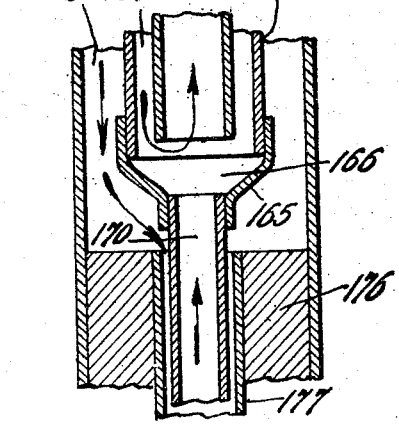
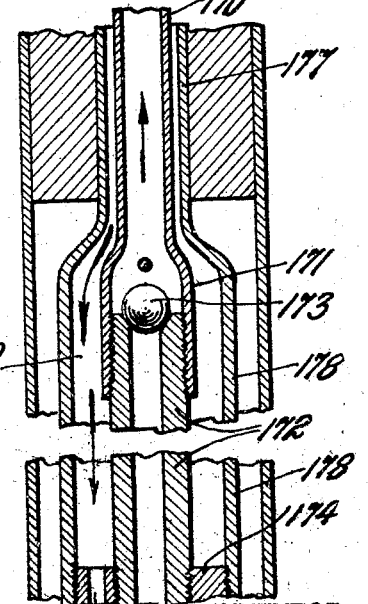
INVENTOR
GEORGE C. STANLEY
BY
ATTORNEY Patented July 29, 1941

2,251,244

UNITED STATES PATENT OFFICE 2,251,244

PRESSURE REGULATOR

George C. Stanley, Great Barrington, Mass.

Application October 6, 1939, Serial No. 298,207

18 Claims. (Cl. 166—2)

This invention relates to pressure regulators. More particularly, the invention relates to pressure regulators one use of which is in the operaton of oil wells and the like. This latter phrase is to be understood to include oil and gas wells and gas wells, as the invention is applicable to both types of wells. For convenience of description, however, the invention is here described simply in terms of an "oil well."

It has been found that fluctuations in the back pressure on oil sands are detrimental to the efficient operation of a well. It is generally agreed by oil and gas engineers that a steady back pressure results in an increase in the amount of gas dissolved in the oil. This reduces the viscosity and surface tension of the oil, thereby decreasing resistance to the flow of oil through the sands.

It is also known that, for a given well, a steady back pressure, compared to an equal amount of fluctuating back pressure, decreases the by-passing of gas through oil in the oil sands. For this reason a steady back pressure results in a higher temperature of the gas and oil in the oil sands resulting, in turn, in a decrease in the formation of residues and the plugging of sand pores.

Another advantage of a steady back pressure is in the matter of water. The rate of flow of oil, for a given amount of pressure differential, is influenced by the amount of gas dissolved in the oil but the rate of flow of water is substantially constant because it does not absorb appreciable amounts of gas. It follows that the decreased frictional resistance to the flow of oil and the smaller number of plugged sand pores, resulting from a steady back pressure, result in a more rapid flow of oil as compared to the flow of water. Consequently, with a proper amount of steady back pressure, oil will flow properly into the well but the flow of bottom-hole water into the well is decreased or largely prevented.

Various methods and types of apparatus have been proposed from time to time for decreasing fluctuations in back pressure. While considerable progress has been made in this respect, these known methods and forms of apparatus, at least for certain types of well, are subject to various disadvantages.

One of these disadvantages of known forms of apparatus for decreasing fluctuations in back pressure is that their operation depends on differences in pressure existing in the fluid columns above and below the so-called solid fluid level, fluctuations in back pressure being principally created above this level. It follows that fluctuations in pressure in the upper fluid column are transmitted to the lower fluid column and hence, become fluctuations in back pressure on the oil well sands.

It is the principal object of the present invention to provide a pressure regulator for wells, such that fluctuations in back pressure on oil and gas and gas sands may be largely eliminated and the well operated with a relatively steady back pressure.

It is a further object of the invention to provide a pressure regulator which avoids the disadvantages of known types of apparatus; which depends for its operation, not on differences in pressure existing in the upper and lower fluid column, but on differences in pressure in the lower fluid column as compared to an artificial constant pressure; and which is of such character that the effects of fluctuations in pressure in the upper fluid column are largely eliminated.

With these general objects in view, as well as others which will be apparent to those skilled in the art, the invention consists in the features, combinations, details of construction and arrangements of parts which will first be described in connection with the accompanying drawings and then more particularly pointed out.

In the drawings:

Figure 1 is a conventional view of an oil well showing, more or less diagrammatically, apparatus constructed in accordance with the invention installed therein;

Figure 2 is a vertical sectional view (enlarged over Figure 1) of one embodiment of a pressure regulating apparatus constructed in accordance with the invention;

Figure 3 is an enlarged view of part of Figure 2;

Figure 4 is a sectional view (enlarged) taken on the line 4—4 of Figure 2;

Figure 8 is a similar view, on an enlarged scale, of still a further embodiment; and Figure 9 is a vertical sectional view (reduced) showing part of the apparatus of Figure 8 and part of the well above the same.

Figures 5, 6, 7:
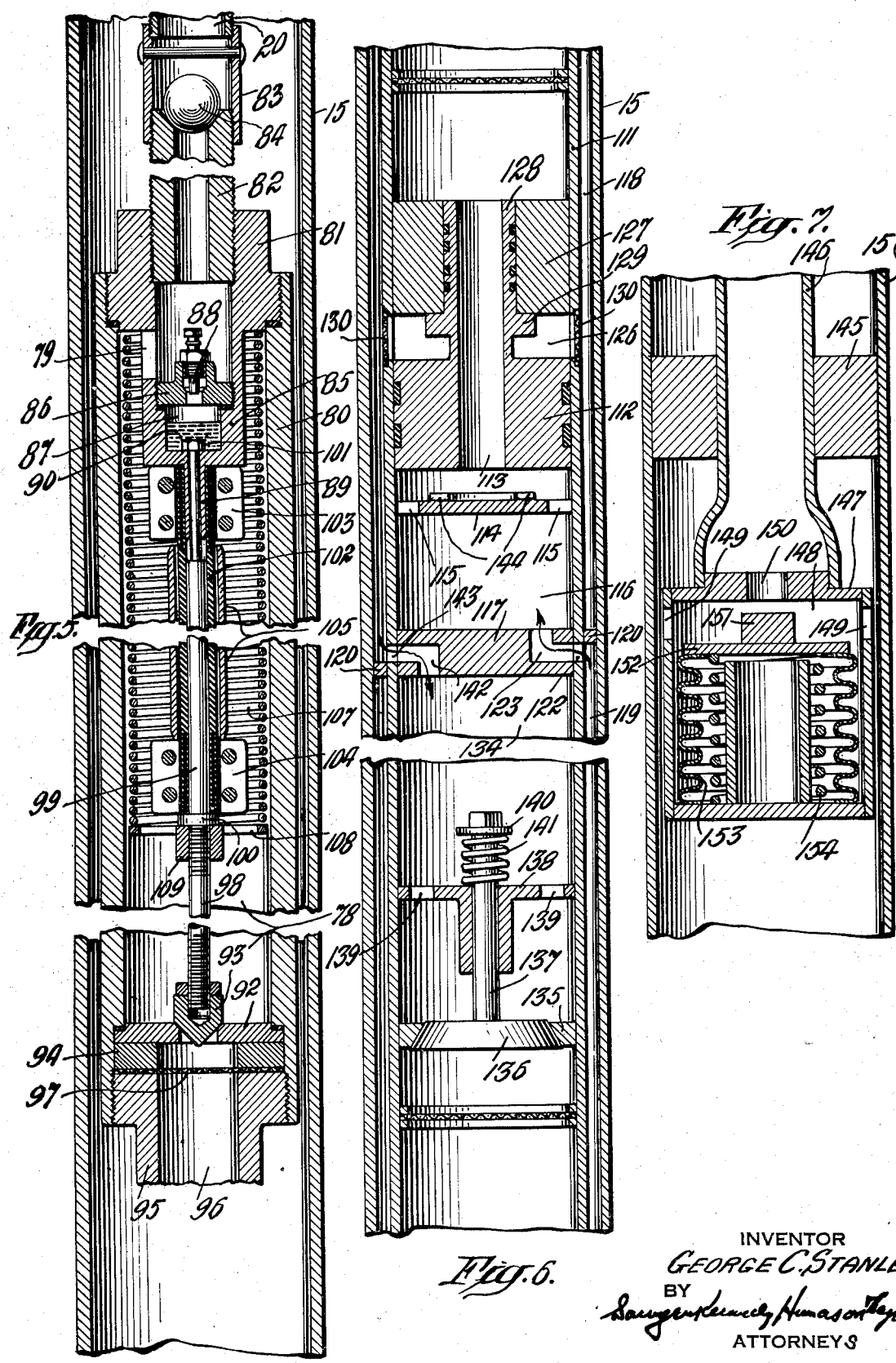
Figure 5 is a vertical sectional view of a modification of the apparatus shown in Figure 1.
Figure 6 is a similar view of another embodiment of the invention.
Figure 7 is a similar view of a further embodiment.

Referring to the drawings, Figure 1 illustrates more or less conventionally a well which may be an oil and gas well or a gas well but is here referred to as an "oil well."

The well illustrated in Figure 1 comprises a casing 15 extending from a point above the ground level 16 down to the bottom 17 of the well in the oil sand 18. The top of the casing is closed by a casing head 19. Extending down into the casing 15 is a tubing 20 through which the oil is conducted to a point of delivery above ground.

It is my belief that fluctuations in the back pressure on oil sands are created principally above and not below the so-called solid fluid level, and the regulating mechanism of the present invention is so designed and so located as to eliminate, at least to a large extent, the transmission of these fluctuations in pressure from above the solid fluid level to the oil sand. To this end, the invention in its entirety includes a pressure regulating mechanism, preferably located below the so-called solid fluid level and comprising a control unit including a valve for controlling the flow of oil up through the well, said control unit being subject to the pressure of the fluid column below the well and to an artificial, substantially constant counter pressure, whereby the opening controlled by said valve enlarges as the fluid pressure below the valve increase above a predetermined amount and diminishes as such fluid pressure decreases.

One embodiment of the invention is illustrated in Figures 2-4 and is indicated generally in Figure 1 by the reference character 22. As there shown, the regulating mechanism is located below the so-called solid fluid level, indicated by the broken line 21, and is connected with tubing 20.

In connection with any description herein of opening and closing of the valve, it is to be noted that under some circumstances, hereinafter referred to, it is desirable that the valve shall not shut entirely. Consequently, "closed" position of the valve is to be understood to mean the position of the valve giving a minimum passage for the oil, be such passage zero or otherwise, and "open" position of the valve means a position giving a passage for the oil greater than minimum.

While the valve may be constructed and operated in various ways and while the predetermined counter pressure may be established in various ways, in the embodiment illustrated as an example in Figures 2 and 4 the valve is operated by a special type of piston and the predetermined pressure is established by sealed gaseous pressure. In this exemplification, the parts indicated generally at 22 in Figure 1 comprise a tubular shell 25 connected by a reducer 26 with the lower end of the well tubing 20 and enclosing a chamber 27. Adjacent the lower end of shell 25 is a valve housing 29 having a plurality of ports or openings 30 for the flow of oil. This housing 29 is bolted to a flange 31 threaded into the lower end of shell 25 and forming part of a valve-seat retaining assembly. Also threaded into the lower end of shell 25 is a tubular element 32 which serves to hold a sealing gasket 28 in place and which forms a chamber 33 open at the bottom to the flow of oil.

Extending downwardly from flange 31 is a tubular extension 34 into which is threaded a ring 35 which functions as a valve seat. Also threaded into extension 34 is a tubular lock nut 36. With the construction described, the relative position of the valve seat may be adjusted for a purpose hereinafter referred to.

The invention in its entirety includes a valve operating unit so designed and arranged that the effects on the operation thereof, of fluctuations in pressure in the upper fluid column are largely eliminated or minimized. This may conveniently be accomplished by what may be termed a protected piston, that is, a piston largely isolated from the effects of such pressure fluctuations. While capable of various constructions, that shown as an example in Figures 2-4 includes a valve element 37 formed as the headed end of a piston rod 38 which is part of a special piston unit. Rod 38 has, at about its central portion, an enlarged piston "head" 40. This piston rod and head are enclosed in a sleeve 41 of an elastic, i. e. compressible and stretchable, material. As is more fully described hereinafter, the upper face of piston head 40 is under a constant gaseous pressure and the upper part of sleeve 41 forms part of a sealed chamber. To this end, a seal is effected between sleeve 41 and piston head 40 by means of a clamp 42 which tightly clamps the sleeve to the piston head. The upper end of elastic sleeve 41 is similarly clamped, by a clamp 43, to a tubular extension 44 on a housing 45 which is suspended by a flange 46 from an internal shoulder formed in shell 25. Between this shoulder and flange 46 is a sealing gasket 47 to prevent leakage and between flange 46 and reducer 26 is a similar gasket 48. The lower end of elastic sleeve 41 is similarly clamped, by a clamp 49, to a tubular extension 50 formed on valve housing 29.

In the embodiment here illustrated as an example, the elastic sleeve 41 is reinforced at the area within clamp 43 by a fiber reinforcement 55 (Figure 3) molded into the sleeve and is protected from the clamp by a metallic collar 56. Similar reinforcement and protection are provided at the other clamping areas, as appears in Figures 2 and 4.

It will now be apparent that the upper and lower ends of elastic sleeve 41 are anchored by respective clamps 43, 49, whereas central clamp 42 floats. When, therefore, the piston rod is moved upwardly, as hereinafter described, that portion of sleeve 41 between central clamp 42 and lower clamp 49 will be stretched and that portion of the sleeve between central clamp 42 and upper clamp 43 will be compressed. On reverse movement of the piston rod, that portion of sleeve 41 between central clamp 42 and lower clamp 49 will be compressed and that portion of the sleeve between central clamp 42 and upper clamp 43 will be stretched. Excessive vertical rise of the piston rod is prevented by a stop formed by a tip 58 on the latter which seats against a shoulder 59 in tubular extension 44.

While the elastic sleeve 41 may be made of various materials, it should be of a material that is pressure tight and highly resistant to the influence of oil, salt water and other substances which may occur in oil wells. For this purpose I have found that the synthetic rubber material marketed under the trade name "Neoprene" and used for oil well gaskets and gasoline hose is particularly suitable.

While the length of sleeve 41 may vary, it is to be noted that the sensitiveness of movement for opening and closing the valve can be increased by increasing the length of the sleeve and piston.

The valve mechanism can also be rendered more sensitive to pressure changes by adjusting the extent of the valve movement. In this connection, neutral position of the piston unit may be considered as the position in which, with atmospheric pressures only exerted above piston head 40 and below valve 37, and ignoring the effect of the weight of the parts, there is no stretch or compression in the neoprene sleeve. The position of the valve, when the piston unit has this neutral position, is considered "closed" position, i. e. "closed" as above defined. In such neutral or "closed" position, however, the valve may or may not be closed in the sense that it is shut tight against its seat. It is noted that the neutral position will not be changed by the application of artificial pressure in chamber 67 and an equal amount of pressure in the fluid column in chamber 33 below the valve.

In the exemplification illustrated in Figure 2, the valve 37, in neutral position of the parts, does not shut tight against its seat. Figure 2 shows such neutral position. While the valve is not shut tight, it is "closed" as above defined. With a cylindrical valve seat and a flat valve, as in the embodiment of Figure 2, there is a maximum effective lift of the valve necessary to take care of maximum flow through the valve seat and any additional lift is superfluous. This maximum lift is readily figured as one fourth the inner diameter of the valve seat. It is sometimes desirable to set the parts initially so that in neutral or "closed" position of the valve, a considerable part but not all of the flow of liquid produced by the well is permitted to pass the valve at the predetermined amount of pressure created in chamber 67 and created by the well in the fluid column in chamber 33 below the valve. Thus, the valve, in neutral position, may conveniently be lifted 50%, for example, of its estimated maximum lift. With such an arrangement, the stretch of elastic sleeve 41, during subsequent lift of the valve, is correspondingly reduced and the valve mechanism rendered more sensitive to pressure changes. In addition, with a neutral position such that the valve is not shut tight, a continuous flow of some oil is assured under practically any conditions. Such a continuous flow may be desirable for various reasons, e. g. it eliminates danger of the valve sticking to its seat.

It will be seen that the amount of actual lift of the valve for neutral position may be varied by adjusting the relative position of valve seat 35. In fact, if desired, the valve may, in this manner, be caused to shut against its seat in neutral position.

As before stated, the predetermined counter pressure for the piston and valve unit is, in the exemplification illustrated in Figures 2–4, effected by sealed gaseous pressure. To this end, as here shown as an example, threaded into housing 45 is a head 65 and between this head and the lower part of the housing is a cap 66. Housing 45 and cap 66 enclose a pressure chamber 67. The upper end of this chamber is sealed by gaskets 68, 69, located, respectively, between housing 45 and cap 66 and between cap 66 and head 65. Cap 66 has a one way valve of any suitable construction and indicated generally at 70, for charging the chamber 67 with gas to set up the desired amount of predetermined counter pressure. In the embodiment illustrated as an example in Figure 2, the lower portion of pressure chamber 67 contains oil 71 which acts as a fluid seal and also serves to lubricate between the piston rod and the upper part of sleeve 41. It will be noted that the pressure chamber includes not only chamber 67 proper but also the bore of tubular extension 44 and the annular space between the piston rod and sleeve 41 down to piston "head" 40. Thus, the piston unit is under a constant predetermined downward pressure which is fixed by the amount of gaseous pressure in the chamber.

It will be apparent that the oil in chamber 67 can pass downward through the connecting space but for convenience of illustration, it is not so shown. Also for convenience, the oil is omitted entirely from Figure 3.

When the well is in operation, the pressure in space 27 is less than the pressure in the pressure chamber inside the upper part of the sleeve 41, i. e. above piston head 40. This pressure differential tends to expand this portion of the sleeve which, together with the lubrication from the oil, insures the sleeve against sticking to the piston rod. Below the piston head, the pressures inside and outside the lower part of the sleeve are equal. Thus, while there may be no oil in this space, there is nothing to cause the sleeve to stick because the arrangement of the parts and the existence of equal pressures inside and outside the sleeve result in a free space between the sleeve and the piston rod.

To prevent undue distortion and the like of the elastic sleeve 41, that portion of the sleeve between upper clamp 43 and middle clamp 42 is surrounded by a metallic protective sleeve 74 and that portion between middle clamp 42 and lower clamp 49 by a similar protective sleeve 75.

It will now be apparent that the valve and piston unit is under a constant downward pressure fixed by the amount of gaseous pressure in chamber 67 and under an upward pressure determined by the pressure of the fluid column in chamber 33.

The construction described provides what, as previously stated, may be termed an isolated or protected piston. That is, the piston and valve unit, in its operation, is protected from and rendered substantially independent of fluctuations in the pressure of the upper fluid column. It will be apparent that the piston and valve unit, above piston head 40, is completely isolated from the fluid column in chamber 27, being enclosed in a sealed chamber. The sleeve 41 at the points just below fixed clamp 43 and just above fixed clamp 49 has the same diameter, whereby any upward and downward thrusts thereon from the fluid column in chamber 27 balance out. The maximum area of the piston unit below clamp 42, which is the only part thereof directly in contact with the fluid column above the valve, i. e. the fluid column in chamber 27, is equal to the area of the piston just below middle clamp 42. This area is equal to the area of the valve seat 35. It follows that the upward and downward thrusts directly on the piston are equal and the effect of pressure fluctuations in the fluid column above the valve on the valve and piston unit are substantially eliminated.

It is my belief that as long as oil is delivered out of the lower fluid column in an amount equal to the production of the well, there will be a steady back pressure on the oil sands. The apparatus of the present invention is designed so to regulate the flow past the valve as to obtain a substantial equilibrium between the amount delivered out of the lower fluid column and the production of the well.

Assuming, for the purposes of description, that the pressure in chamber 33, i. e. the pressure of the fluid column below the valve, is no greater than the counter pressure, valve 37 will have some such position as shown in Figure 2. In this particular embodiment, this neutral or closed position permits some flow of oil. The oil flows from chamber 33 through valve seat 35, around valve 37, out through ports 30, into and up through chamber 27, through port 39 formed in housing 45 and thence into and up through tubing 20.

If and when the pressure in chamber 33 starts to exceed the fixed counter pressure, this excess of pressure in the fluid column below the valve causes the valve and piston unit to move upwardly, the extent of valve lift depending on the amount of such excess. Thus, the valve "opens" in the sense that the space through which the oil may flow is enlarged. The valve continues to open or remains open as long as such excess continues. This opening of the valve permits more oil to flow past the valve. Since an increase in pressure in chamber 33 means that oil is being delivered out of the lower fluid column in amount less than the production of the well, which condition would tend to cause a fluctuation in back pressure, the opening of the valve corrects this condition.

Conversely, when, for any given "open" position of the valve, the excess of pressure in chamber 33 decreases below the amount for which the valve has such opening, the valve and piston unit will move downwardly, the extent of downward movement depending on the amount of decrease in such excess. This "closes" the valve in the sense that the space through which the oil may flow is diminished, thus permitting less oil to flow past the valve. Since a decrease in pressure in chamber 33 means that oil is being delivered out of the lower fluid column in amount greater than the production of the well, which condition would tend to cause a fluctuation in back pressure, the closing of the valve corrects this condition.

Thus, it will be seen that any change in pressure in the lower fluid column to an amount above or below that pressure which allows delivery of oil out of the lower fluid column in amount substantially equal to the production of the well, causes valve 37 to open or close, as the case may be, in such manner as to effect a change in the pressure in the lower fluid column in a direction tending to maintain a steady back pressure.

It will be apparent that should the pressure in chamber 33 be less than the counter pressure, valve 37 would drop below the neutral position of Figure 2. But as the pressure of a given well can be estimated fairly accurately, the counter pressure may be so predetermined that this is not likely to occur under normal conditions.

Instead of a counter pressure by sealed gas, the predetermined counter pressure may be set up in whole or in part by a spring. An example of such an embodiment is illustrated in Figure 5. As there shown, the well casing 15 may be considered as the same casing, and the tubing 20 as the same tubing, as in the construction of Figures 1–4.

The pressure regulator comprises a shell 80 which encloses a chamber or space 78 generally corresponding to space 27 in the embodiment of Figure 2. Shell 80 is connected by a reducer 81 with a tube 82 connected, in turn, by a coupling 83 with the end of the well tubing 20. As shown as an example, the upper rim of tube 82 is beveled to form a seat for a ball check valve 84. While such check valve is not essential, it serves to prevent back surges from the upper fluid column from having damaging effect on the regulator unit.

While the pressure regulator valve may vary in construction and arrangement, as shown as an example in Figure 5, in the lower end of shell 80 is a washer 92 the opening of which is beveled to form a valve seat for a conical valve 93. Below valve seat element 92 is a second washer 94 and below that a screen 97. Threaded into the lower end of shell 80 is a tubular element 95 serving to hold the screen and washers in place and enclosing a chamber 96 open to the flow of oil.

Valve 93 is adjustably mounted on a valve rod 98 connected to a piston rod 99. The lower end of the piston rod has a collar 100. Adjustably mounted on valve rod 98 is the hub 109 of a spider 108. As here shown as an example, the predetermined counter pressure is effected, at least in part, by a coil spring 107 which is confined between spider 108 and coupling 81.

In the embodiment illustrated as an example in Figure 5, provision is again made for substantially isolating the piston and valve unit from the effects of pressure fluctuations of the upper fluid column. To this end, reducer 81 has an extension 85 forming a housing in the side wall of which are one or more ports 79. Below the latter is a cap 86 which, with the housing 85, encloses a chamber 87. Cap 86 has a one way valve indicated generally at 88 for maintaining air or other gas at atmospheric or other pressure in chamber 87. Housing 85 has an extension 89 of smaller diameter. To this extension 89 is clamped, by a clamp 103 like the clamps previously described, one end of an elastic sleeve 102. The other end of this sleeve, which may conveniently be made of the same material as sleeve 41, e. g. Neoprene, is similarly clamped, by clamp 104, to piston rod 99. Thus the upper end of the sleeve is anchored and the lower end floats. When the valve unit moves upwardly, sleeve 102 is compressed, stretching upon reverse movement of the valve unit.

Piston rod 99 extends upwardly through housing extension 89 into chamber 87 and at its upper end has a cap nut 101. The lower part of chamber 87, as in the case of the embodiment of Figure 2, is filled with oil 90. It will be seen that the chamber 87, in fact, extends down inside sleeve 102 as far as the lower clamp 104. While the drawings appear to show sleeve 102 in contact with the piston rod, it is to be understood that there is or may be sufficient clearance for the oil 90. For convenience of illustration, no attempt has been made to show this oil below main chamber 87. Such oil serves both as a liquid seal and to prevent sleeve 102 from sticking to the piston rod 99. Undue distortion of sleeve 102 is prevented by a protective sleeve 105.

With the construction described, the upper side of the piston unit is isolated from the fluid column in chamber 78, being enclosed in a sealed chamber. As to the piston and valve unit outside such sealed chamber, the diameter of the opening of valve seat 92 is equal to the diameter of sleeve 102 just below clamp 103. It follows that for the aggregate area subject to any downward thrust from the pressure of the upper fluid column there is a corresponding and balancing aggregate area subject to upward thrust therefrom. Thus, as in the former embodiment, the effects of fluctuations in pressure of the upper fluid column on the operation of the valve and piston unit are substantially eliminated.

Chamber 87 may contain air at atmospheric pressure or air or other gas at a pressure higher than atmospheric pressure. In either case, the upper part of the piston is isolated. The latter case has the advantage that sleeve 102 is less likely to stick to the piston rod.

Figure 5 shows the valve shut tight. It is to be understood, however, that in neutral or "closed" position of the valve, the valve may be shut tight or may be partly lifted, as may be desired.

The valve unit is under a constant downward pressure which may be obtained entirely from the force of spring 107 or in part by the spring and in part by air or other gaseous pressure in chamber 87, and under an upward pressure determined by the fluid pressure in chamber 96, i. e. the pressure of the fluid column below the regulator. Whenever the fluid pressure in chamber 96 starts to exceed the counter pressure, this excess of pressure in the lower fluid column causes the valve and piston unit to move upwardly, opening the valve, the extent of lift depending on the amount of such excess pressure. The valve continues to open or remain open as long as such excess pressure continues.

With valve 93 open, oil flows from chamber 96 through the opening in valve seat 92, up through chamber 78, inwardly through ports 79, upwardly through tube 82, past check valve 84 and up through tubing 20.

Conversely, when, for any given open position of valve 93, the excess of pressure in chamber 96 decreases below the amount for which the valve has such opening, the valve and piston unit will move downwardly, the extent of downward movement depending on the amount of decrease in such excess. This closing movement of the valve diminishes or shuts off, as the case may be, the space through which oil may flow, thus permitting less or no oil to flow past the valve.

Thus, as in the former construction, there results a substantial elimination of fluctuations in the back pressure on the oil sands.

In accordance with the invention in its entirety, the predetermined counter pressure may be effected by injected gas pressure. An example of such an embodiment is illustrated in Figure 6.

As there shown, the well casing 15 may be considered as the same casing as in the previous embodiments. Within casing 15 is a cylinder or shell 111 the upper end of which may be connected to or serve as a well tubing. Slidable in cylinder 111 is a piston element 112 forming part of a hollow piston unit having a central bore 113. This piston element 112 serves as a valve for controlling the flow of oil. To this end, as here shown as an example, below piston element 112 is a fixed valve seat 114 having a plurality of ports 115 around its edge. These ports open into a pressure chamber 116 which is closed at the bottom, except as herein mentioned, by a partition 117.

The annular space between the casing 15 and cylinder 111 is divided, adjacent partition 117, into upper and lower portions 118, 119 by a packer arrangement 120.

Lower annular space 119 is open to the well to take the flow of oil and is connected with chamber 116. To this end, space 119 communicates, through a suitable passage in the packer 120, with a port 122 formed in the wall of cylinder 111. This port communicates, in turn, with a passage 123 formed in partition 117 and opening into chamber 116.

The predetermined counter pressure is set up by gas pressure injected from above. To this end, as here shown as an example, upper annular space 118 is connected with a source of gas (not shown) at a point above ground, delivered at a constant or substantially constant pressure. Upper annular space 118 also communicates with a pressure chamber 126 above piston element 112 through screened ports 138 formed in the wall of cylinder 111. The upper wall of chamber 126 is formed by a cylinder wall 127 in which operates a supplemental piston element 128 integral with piston element 112 but of a smaller diameter. A flange 129 on the piston unit serves as a stop to limit upward movement of the latter by engaging part 127.

Figure 6 shows the valve open. In "closed" position, the piston 112 seats against valve seat 114. It is possible, however, to give the valve, in this "closed" position, what amounts to a partial "lift". To this end, the annular top of valve seat 114 is provided with one or more slots 144. These slots permit a slight flow of fluid past the valve, of an amount which is less than the flow of fluid into the well at the operating back pressure, even when piston 112 is against its seat. They also aid in preventing the valve from sticking to the seat. It is to be understood that if it is desired to have the valve shut tight in "closed" position, slots 144 may be omitted.

It will be seen that the valve is under a constant downward pressure determined by the gas pressure in chamber 126 and under an upward pressure determined by the pressure in chamber 116, i. e. the pressure of the fluid column below the regulator. As long as the pressure in chamber 116 is less than the counter pressure, the valve will take its "closed" position, i. e. will be against its seat 114. In this position there will be a slight flow of fluid or no flow, depending on whether slots 144 are used or not. Assuming the valve to be in this "closed" position, when and if the pressure in chamber 116 starts to exceed the fixed counter pressure, this excess of pressure in the fluid column below the piston-valve unit causes the latter to move upwardly against the counter pressure, opening the valve, the extent of lift depending on the amount of such excess. The valve-piston unit continues to open or remain open as long as such excess continues.

With the valve open, oil flows from chamber 116 through ports 115, through the bore 113 of the piston unit and thence up the well.

Conversely, when for any given open position of piston valve 112, the excess of pressure in chamber 116 decreases below the amount for which the valve has such opening, the piston unit will move downwardly, the extent of downward movement depending on the amount of decrease in such excess. This closing movement of the valve diminishes the space through which oil may flow, thus permitting less oil to flow past the valve. If the closing movement continues to the extent that the valve seats, the flow of oil is reduced to a minimum or shut off entirely, depending on whether slots 144 are used or not.

Thus, as in the former constructions, there results a substantial elimination of fluctuations in the back pressure on the oil sands.

It will be seen that the piston unit in the embodiment of Figure 6 is also under a downward pressure measured by the pressure of the upper fluid column above part 127, such pressure acting on the annular top of supplemental piston element 128. This area, however, is so relatively small that an assumed constant pressure of the upper fluid column may be used for arriving at the desired predetermined counter pressure. Any fluctuations in the pressure of the upper fluid column are, for all practical purposes, eliminated, as far as they affect the proper functioning of the regulator, because the area of the top of supplemental piston element 128 is so small relative to the effective areas acted upon by the gas pressure and the pressure of the lower fluid column.

There is provided means for disposing of fluid in annular space 118, for example, fluid created by condensation of gas, water which may leak through the casing, etc. To this end, as here shown as an example, in the space 134 below partition 117 is a fixed valve seat 135 in which seats a frusto-conical relief valve 136. This valve is mounted on a valve stem 137 sliding in a hub forming part of a plate 138 having ports 139. Valve stem 137 extends above plate 138 and terminates in a collar 140. Between collar 140 and plate 138 is a coiled spring 141 normally holding the valve closed.

Space 134 is in communication with upper annular space 118 through a passage 142 formed in partition 117 and a port 143 formed in the wall of cylinder 111 and communicating, through a suitable passage in packer 120, with space 118.

It will be seen that relief valve 136 is under an upward pressure determined by the pressure of the lower fluid column plus the force of spring 141 and under a downward pressure determined by the injected gas pressure. The arrangement is such that valve 136 will remain closed except when the downward pressure is sufficiently augmented by the weight of a given volume of liquid. Thereupon the valve opens, permitting such liquid to drain away down the well. As soon as this has occurred, the normal pressure differential is again effective and valve 136 closes.

Figure 7 illustrates a further modification. In the embodiment there illustrated as an example, the casing 15 may be considered as the same well casing. In the casing is a packer 145 through which passes a tubular member 146 which may be connected to or serve as a well tubing. The lower and enlarged end of tubular member 146 is secured to the top wall of a housing 147 enclosing a chamber 148. This chamber communicates, through ports 149, formed in the side walls of housing 147, with the lower part of the well.

In the upper wall of housing 147 is a port 150 and the wall surrounding such port serves as a valve seat. Cooperating with this valve seat and port is a valve unit comprising a valve 151 mounted on a plate 152. This valve unit is carried by a bellows 153 the lower end of which is anchored in the bottom of housing 147, the upper end being anchored to plate 152. Between plate 152 and the bottom of housing 147 is a coil spring 154 normally tending to move the valve unit upwardly. The space within the bellows may be at atmospheric or other predetermined pressure.

Figure 7 shows the valve open. It is to be understood that in neutral or "closed" position, the valve may be shut tight or partly "lifted", i. e. partly separated from its seat, as may be desired. The valve is under a constant upward pressure determined by the force of spring 154 and the gaseous pressure, if any, within the bellows and under a downward pressure determined by the pressure in chamber 148 i. e. the pressure of the fluid column below the regulator. It will be seen that as long as the pressure in chamber 148 does not exceed the counter pressure, the valve will take the neutral position for which the parts are set, be that position a shut or partly "lifted" valve. Assuming the valve to be in its neutral position, when and if the pressure in chamber 148 starts to exceed the counter pressure, this excess of pressure in the fluid column above the valve causes the latter to move downwardly against the counter pressure, opening the valve, the extent of this movement, which may be considered as valve "lift", depending on the amount of such excess. The valve continues to open or remain open as long as such excess continues.

With the valve open, oil flows from chamber 148 through port 150 and thence up through tube 146.

Conversely, when, for any given open position of valve 151, the excess of pressure in chamber 148 decreases below the amount for which the valve has such opening, the valve unit will move upwardly, the extent of such movement depending on the amount of decrease in such excess. This closing movement of the valve diminishes or shuts off, as the case may be, the passage through which oil may flow, thus permitting less or no oil to flow past the valve.

Thus, as in the former embodiments, there results a substantial elimination of fluctuations in the back pressure on the oil sands.

It will be noted that when the valve unit is closed, the area acted upon by the pressure of the upper fluid column is relatively small compared to the area acted upon by the pressure of the lower fluid column. It follows that any effects of fluctuations of pressure in the upper fluid column on the operation of the valve are largely eliminated.

In the constructions above described, no reference has been made to the means of lifting oil to the ground surface, i. e., whether by natural pressure, pumping, gas lift, etc., and it is to be understood that any suitable method may be used. Figures 8 and 9, however, illustrate an embodiment designed for gas lift. This embodiment also involves a pressure regulating valve of the diaphragm type.

It is noted that Figures 8 and 9, though drawn to a different scale, show different parts of the same well, the two views overlapping somewhat.

The embodiment illustrated as an example in Figures 8–9 includes provision for delivery, into the well, of two gas supplies. One gas supply is utilized for gas lift delivery of the oil; the other for the counter pressure of the regulating system. To this end, as here shown as an example, the usual well casing 160 is closed above ground level 161 by a casing head 162. Suspended in any suitable manner within the casing and extending downwardly any desired distance, is an inner tubing 163 for the delivery of oil from the well. Also extending down into the well for roughly the same distance is an outer tubing 164. At a point adjacent the lower end of inner tubing 163, outer tubing 164 is connected to a reducer coupling 165 forming a chamber 166. It will be seen that tubing 164 forms a part of two annular spaces 167, 168 in the casing. The inner annular space 167, which opens into chamber 166, is connected, above ground, with a source of lift gas (not shown) for lifting the oil upwardly through tubing 163. The outer space 168 communicates with a pipe 169 which is connected with a source of gas (not shown) for setting up counter pressure in the regulator.

Oil and gas from the well pass to chamber 166 via a tubing 170 connected, at its upper end, to coupling 165. At its lower end, tubing 170 has an enlarged end 171 connected to a tubular element 172. The upper end of the latter is concaved to form a seat for a ball check valve 173. Tubular element 172 is threaded into a block 174 forming part of the regulator mechanism and having a central chamber 175 communicating with the bore of tubular element 172.

Just below coupling 165 is a cylindrical packer 176. Set in the inner wall thereof is a tubing 177 which has an enlarged lower end 178 threaded onto block 174. This tubing 177 forms, with tubing 170, an annular space 179 which communicates with space 168 for delivering counter pressure gas to the regulator. Annular space 179 communicates with the mouth of a bore 181 formed in block 174.

Flow of oil and gas through the regulator is controlled by a diaphragm valve. To this end, as here shown as an example, set in block 174 is a valve seat 185 having a port 186. Valve seat 185 is retained in place by a lock nut 187 and its relative position may be adjusted as desired.

Cooperating with this valve seat and port 186 is a diaphragm valve 188 the edge of which is clamped between block 174 and a plate 189. The latter is held in place by a tubular nut-like element 190 threaded into a skirt 191 on block 174.

Below plate 189 and within tubular element 190 is a pressure chamber 192 which is in communication with the source of counter pressure gas. To this end, plate 189 is cut away to form a passage 193 leading from bore 181 to chamber 192. Gas under constant or substantially constant pressure is delivered to chamber 192 through pipe 169, space 168, space 179, bore 181 and passage 193. The underside of the diaphragm 188 is subjected to this gas pressure in chamber 192 by virtue of passages 194 passing through plate 189.

On the diaphragm is a handle 195 to aid in assembly and disassembly.

The upper face of diaphragm 188 is subjected to the pressure of the lower fluid column. To this end, block 174 is formed with one or more diagonal bores 198 opening above the diaphragm and communicating, through screens 199, with the space 200 between the regulator and casing 160 and up through which the oil flows.

Figure 8 shows the diaphragm valve fully open. It is to be understood that in neutral or "closed" position, the diaphragm may be shut tight or partly "lifted," i. e. partly separated from its seat, as may be desired. The diaphragm is under a constant upward pressure determined by the gas pressure in chamber 192 and under a downward pressure determined by the pressure in bores 198, i. e. the pressure of the fluid column below the regulator. It will be seen that as long as the pressure in bores 198 equals the counter pressure, the diaphragm valve will take the neutral position for which the parts are set, be that position a shut or partly "lifted" valve. Assuming the diaphragm to be in its neutral position, when and if the pressure in bores 198 starts to exceed the counter pressure, this excess of pressure in the fluid column above the diaphragm causes the latter to move downwardly against the counter pressure, opening the valve, the extent of this movement, which may be considered as valve "lift," depending on the amount of such excess. The diaphragm valve continues to open or remain open as long as such excess exists.

With the diaphragm valve open, oil flows from bores 198 past the diaphragm, through port 186, through chamber 175 and the bore of tubular element 172, past check valve 173, up through tubing 170 and chamber 166, and thence up through tubing 163 to the delivery point.

Conversely, when, for any given position of diaphragm valve 188, the excess of pressure in bores 198 decreases below the amount for which the diaphragm has such opening, the diaphragm will move upwardly, under the counter pressure, the extent of such movement depending on the amount of decrease in such excess. This closing movement of the diaphragm valve diminishes or shuts off, as the case may be, the passage through which oil may flow, thus permitting less or no oil to flow past the valve.

Thus, as in the former embodiments, there results a substantial elimination of fluctuations in the back pressure on the oil sands.

Because of the relative areas involved, the effects of fluctuation in the pressure of the upper fluid column are largely eliminated, as in the case of the construction of Figure 6.

Means is provided for disposing of condensation liquids, leakage of water, etc. To this end, threaded into nut-like element 190 is a cylindrical element 201 to which is secured a block 202 having a central passage 203. The lower end of this passage is beveled to form a valve seat for a conical valve 204 mounted on a valve stem 205. This relief valve operates in the same manner as the relief valve of Figure 6.

If desired, the counter pressure may be effected by the inherent resiliency of the diaphragm itself, by forming the diaphragm of material possessing the desired amount of inherent resiliency. In that case, bore 181 for the injected gas may be plugged.

It is to be understood that the ball check valve shown in Figure 5, or any other suitable form of check valve, may be used in any of the various embodiments and that various ways of creating the counter pressure may be used in the various embodiments. It is also to be understood that any desired method for lifting oil may be used in connection with any of the various embodiments of the pressure regulator.

It will be apparent to those skilled in the art that various changes and modifications in the constructions described may be made without departing from the spirit of the invention or exceeding the scope of the appended claims.

What is claimed is:

1. In a pressure regulator for oil wells and the like, and in combination, means forming a passage for the flow of fluid, a control unit comprising a valve element located in said passage for controlling the flow of fluid therethrough, the valve of said control unit being urged in one direction by the pressure of the fluid column below the regulator, means for effecting a substantially constant pressure on said control unit counter to the pressure of said fluid column, and means whereby the effects on the operation of the control unit of fluctuations of pressure in the fluid column above the valve elements are substantially eliminated.

2. In a pressure regulator for oil wells and the like, and in combination, means forming a passage for fluid, a control unit comprising a valve element in said passage and a piston for operating said valve, said control unit being subject to the pressure of the fluid column below the regulator, means for effecting a substantially constant pressure on said control unit counter to the pressure of said fluid column, and means for substantially eliminating the effects of pressure fluctuations in the fluid column above the valve element on the operation of the control unit, said last named means including means for isolating the area of the piston opposite to the direction of application of the pressure of said fluid column, from the fluid column in said passage.

3. In a pressure regulator for oil wells and the like, and in combination, means forming a passage for the flow of fluid up the well, a control unit comprising a valve element located in said passage and subject to the pressure of the fluid column below the regulator and a piston to one side of which said valve element is connected, means for substantially eliminating the effects of pressure fluctuations in the fluid column above the valve element on the operation of the control unit, said last named means including means forming a sealed chamber for the opposite side of said piston, and means for subjecting the control unit to a predetermined pressure counter to said first-named fluid pressure.

4. In a pressure regulator for oil wells and the like, and in combination, means forming a passage for the flow of fluid up the well, a control unit comprising a valve element located in said passage and subject to the pressure of the fluid column below the regulator and a piston to one side of which said valve element is connected, means for substantially eliminating the effects of pressure fluctuations in the fluid column above the valve element on the operation of the control unit, said last named means including means forming a sealed chamber for the opposite side of said piston, and means whereby said chamber may be supplied with fluid to set up a predetermined pressure counter to said first-named fluid pressure.

5. In a pressure regulator for oil wells and the like, and in combination, means forming a passage for the flow of fluid up the well, a control unit comprising a valve element located in said passage and subject to the pressure of the fluid column below the regulator and a piston to one side of which said valve element is connected, a chamber containing fluid under predetermined pressure, and means for sealing the opposite side of said piston in said chamber, whereby said control unit is under a fixed pressure counter to said fluid pressure.

6. In a pressure regulator for oil wells and the like, and in combination, means forming a passage for the flow of fluid up the well, a control unit comprising a valve element located in said passage and subject to the pressure of the fluid column below the regulator and a piston to one side of which said valve element is connected, a housing having a tubular extension, an elastic sleeve, means for tightly securing one end of said elastic sleeve to said extension and another portion to said piston, said housing, extension and sleeve, with the piston, enclosing a sealed chamber, and means whereby said chamber may be supplied with fluid to set up a predetermined pressure counter to said fluid pressure.

7. In a pressure regulator for oil wells and the like, and in combination, means forming a passage for the flow of fluid up the well, a control valve located in said passage, said valve being subject to the pressure of the fluid column below the regulator, a piston rod to the lower end of which said valve is connected, a piston head on said piston rod intermediate the ends of the latter, an elastic sleeve outside of said piston rod, means for tightly securing an intermediate portion of said sleeve to said piston head, a stationary housing having a tubular extension, means for tightly securing the upper end of said sleeve to said extension, whereby said housing and part of said sleeve enclose a sealed chamber above said piston head, a tubular stationary part adjacent said valve, means for tightly securing the lower end of said sleeve to said part, and means whereby said sealed chamber may be filled with fluid under pressure, whereby said piston and valve unit is under a substantially constant pressure counter to said fluid pressure.

8. In a pressure regulator for oil wells and the like, and in combination, means forming a passage for the flow of oil up through the well, a tubular valve seat in said passage, a valve housing having an opening for the flow of fluid therethrough, a valve in said housing above said seat, said valve being subject to the pressure of the fluid column below the regulator, a tubular extension on said valve housing, an upper housing spaced from said valve housing, a tubular extension on said upper housing, a piston rod to the lower end of which said valve is connected, a piston head on said piston rod intermediate the ends of the latter, an elastic sleeve outside of said piston rod, means for tightly securing the lower end of said sleeve to the tubular extension of said valve housing, means for tightly securing the upper end of said sleeve to the extension of said upper housing, means for tightly securing an intermediate portion of said sleeve to said piston head, whereby said upper housing and part of said sleeve enclose a sealed chamber above said piston head, and means whereby said sealed chamber may be filled with fluid under pressure, whereby said piston and valve unit is under a substantially constant pressure counter to said fluid pressure, said tubular valve seat being adjustable in position with respect to said valve.

9. In a pressure regulator for oil wells and the like, and in combination, means forming a passage for the flow of fluid, a control unit comprising a valve located in said passage for controlling the flow of fluid therethrough, the valve of said control unit being urged in one direction by the pressure of the fluid column below the regulator, and a spring for effecting a pressure on said control unit counter to the pressure of said fluid column.

10. In a pressure regulator for oil wells and the like, and in combination, means forming a passage for the flow of fluid, a control unit comprising a valve located in said passage for controlling the flow of fluid therethrough, the valve of said control unit being urged in one direction by the pressure of the fluid column below the regulator, and means whereby said control unit may be subjected to the pressure of fluid injected from above ground, said injected fluid pressure being counter to said first-named fluid pressure.

11. In a pressure regulator for oil wells and the like, and in combination, means forming a passage for the flow of fluid up the well, a control valve located in said passage and being subject to the pressure of the fluid column below the regulator, a piston rod to the lower end of which said valve is connected, a housing, a tubular extension on said housing, an elastic sleeve outside said piston rod, means for tightly securing the upper end of said sleeve to said tubular extension, means for tightly securing the lower end of said sleeve to said piston rod, whereby said housing and sleeve form a sealed chamber, and a spring for exerting a pressure on said valve and piston unit counter to said fluid pressure.

12. In a pressure regulator for oil wells and the like, and in combination, means forming a passage for the flow of fluid up the well, a ported valve seat in said passage, a piston valve having an internal bore and movable toward and away from said seat, said piston being subject to the pressure of the fluid column below the regulator, means for subjecting said piston to a pressure counter to pressure of said fluid column, and a relief valve below the valve seat and piston for disposing of collected fluid.

13. In a pressure regulator for oil wells and the like, and in combination, means forming a passage for the flow of fluid up the well, a ported valve seat in said passage, a piston valve having an internal bore and comprising a main portion and an extension having an outer diameter relatively small compared to the diameter of the main portion, said piston being movable toward and away from said valve seat, means whereby the main portion of said piston valve may be subjected to the pressure of fluid injected from above ground, said pressure being counter to the pressure of the fluid column below the valve seat, and a relief valve below the valve seat and piston for disposing of collected fluid.

14. In a pressure regulator for oil wells and the like, and in combination, means forming a passage for the flow of fluid up the well, a ported valve seat in said passage, a valve below said seat, said valve being subject to the pressure of the fluid column below the regulator, a movable plate to which said valve is connected, a stationary plate, a bellows connecting said plates, and a spring tending to move said movable plate and the valve toward said valve seat, thereby exerting a pressure on the valve counter to the pressure of said fluid column.

15. In a pressure regulator for oil wells and the like, and in combination, means forming a passage for the flow of fluid up the well, a diaphragm valve in said passage, said diaphragm being subject to the pressure of the fluid column below the regulator, and means for exerting a substantially constant pressure on said diaphragm counter to said fluid pressure.

16. In a pressure regulator for oil wells and the like, and in combination, means forming a passage for the flow of fluid up the well, a valve controlling the extent of such passage available to the flow of fluid, and means whereby, upon changes in pressure in the lower fluid column to an amount above or below a predetermined amount of pressure, namely, the pressure which allows delivery of oil past the valve in amount substantially equal to the production of the well under the operating conditions, said valve opens or closes, as the case may be, to permit a greater or less flow of oil as such pressure changes.

17. The method of eliminating fluctuations in back pressure on oil sands in oil wells or the like, which comprises forming a controllable passage for the flow of fluid up the well, permitting a greater amount of fluid to flow through the passage when and if the pressure in the fluid column below the control point increases to an amount above a predetermined amount of pressure, namely, the pressure which allows delivery of fluid past the control point in amount substantially equal to the production of the well under the operating conditions, and permitting a less amount of fluid to flow through the passage when and if the pressure in said fluid column decreases to an amount below the predetermined pressure which allows such delivery.

18. In a pressure regulator for oil wells and the like, and in combination, means forming a passage for the flow of fluid up the well, two oppositely faced, ported, shallow, dish-shaped seats associated with said passage, a diaphragm valve anchored in said passage between said seats, said diaphragm being subject to the pressure of the fluid column below the regulator, and means for exerting a substantially constant pressure on said diaphragm counter to said fluid pressure.

GEORGE C. STANLEY.